United States Patent [19]

Antenucci

[11] Patent Number: 4,927,649

[45] Date of Patent: May 22, 1990

[54] METHOD OF MAKING A HEMICELLULOSE COATED DIETARY FIBER

[75] Inventor: Robert N. Antenucci, Decatur, Ill.

[73] Assignee: A. E. Staley Manufacturing Company, Decatur, Ill.

[21] Appl. No.: 245,890

[22] Filed: Sep. 16, 1988

[51] Int. Cl.$^5$ ............................................. A23P 1/08
[52] U.S. Cl. ...................................... 426/273; 426/93; 426/804
[58] Field of Search ................... 428/89, 93, 560, 31, 428/251, 273, 288, 289, 293, 309, 804, 635; 424/439

[56] References Cited

U.S. PATENT DOCUMENTS

| | | | |
|---|---|---|---|
| 288,669 | 11/1883 | Schwarzwadder | 426/288 |
| 2,007,693 | 7/1935 | Ruter | 426/288 |
| 2,036,184 | 11/1936 | Camp | 426/439 |
| 2,472,971 | 6/1949 | Hansen | 127/68 |
| 2,709,699 | 5/1955 | Wolf et al. | 260/209 |
| 2,715,067 | 8/1955 | Kamlet | 426/635 |
| 2,772,981 | 12/1956 | Smart | 106/203 |
| 2,801,955 | 8/1957 | Rutenberg et al. | 195/9 |
| 2,868,778 | 1/1959 | Watson et al. | 260/209 |
| 3,358,723 | 12/1967 | Graham | 426/288 |
| 4,181,747 | 1/1980 | Kickle et al. | 426/615 |
| 4,459,280 | 7/1984 | Colliopoulos | 424/493 |
| 4,565,702 | 1/1986 | Morley et al. | 426/93 |
| 4,599,240 | 7/1986 | Thompson | 426/634 |
| 4,619,831 | 10/1986 | Sharma | 426/804 |
| 4,698,232 | 10/1987 | Sheu et al. | 426/572 |
| 4,765,994 | 8/1988 | Holmgren | 426/31 |
| 4,774,096 | 9/1988 | Nickel | 426/629 |
| 4,774,098 | 9/1988 | Gould | 426/622 |
| 4,844,924 | 7/1989 | Stanley | 426/804 |
| 4,859,485 | 8/1989 | Linton | 426/31 |
| 4,865,863 | 9/1989 | Prosise | 426/804 |

FOREIGN PATENT DOCUMENTS 190826 8/1986 European Pat. Off. .
2729370 1/1978 Fed. Rep. of Germany ........ 426/89
51-29271 12/1976 Japan ................................. 426/560

OTHER PUBLICATIONS

J. R. Goldberg, "Jumping on the Band Wagon", *Health*, vol. 18, pp. 45 and 46 (Jun. 1986).

J. R. Goldberg, "Fiber May Bind Colon Carcinogens", *Science News*, vol. 129, p. 43 (Jan. 18, 1986).

B. Lewis, "Dietary Fiber", *Encyclopedia of Chemical Technology*, vol. 7, pp. 628–638 (Kirk-Othmer eds., John Wiley & Sons, Inc., 3d ed., 1979).

S. A. Watson, "Corn Hull Gum", *Industrial Gums*, pp. 299–306 (R. L. Whistler, et al., eds., Academic Press, NY, NY, 1959).

R. L. Whistler, et al., "Carbohydrates", *Encyclopedia of Chemical Technology*, vol. 4, pp. 550–555 (Kirk-Othmer, eds., John Wiley & Sons, Inc., NY, NY 3d ed., 1978).

Chemical Abstracts, vol. 98, Abstract No. 106156u (1983).

Chemical Abstracts, vol. 96, Abstract No. 216613g (1982).

Milling & Baking News, vol. 66, No. 35, p. 79 (Oct. 27, 1987).

*Primary Examiner*—Carolyn Paden
*Attorney, Agent, or Firm*—Michael F. Campbell; J. Daniel Wood

[57] ABSTRACT

A composition of matter comprising an insoluble dietary fiber material coated with hemicellulose is provided. In preferred embodiments, the insoluble dietary fiber material and hemicellulose are derived from grain hulls. The weight ratio of insoluble dietary fiber material to hemicellulose is generally greater than about 1:1. Also provided is a method of coating an insoluble dietary fiber material with a hemicellulose. Preferred embodiments employ a fluidized bed technique to obtain the coating of hemicellulose.

12 Claims, No Drawings

METHOD OF MAKING A HEMICELLULOSE COATED DIETARY FIBER

FIELD OF THE INVENTION

This invention relates to a composition useful as a dietary fiber supplement and to a method of making such a composition.

BACKGROUND OF THE INVENTION

The hulls of cereal grains have long been recognized as a source of fiber in the diet and have recently been the source of much attention, see J. R. Goldberg, "Jumping on the Bran Wagon", *Health*, Vol. 18, pp 45 and 46 (June 1986) and "Fiber May Bind Colon Carcinogens", *Science News*, Vol. 129, p. 43 (Jan. 18, 1986), as a dietary factor in successfully avoiding the occurrence of some cancers.

Refined corn bran products useful as dietary fiber supplements are commercially available, e.g. STALEY® Refined Corn Bran. Refined corn grain hulls are substantially free of caloric nutrients such as starch and protein and generally are comprised of about 99% insoluble fiber. Soluble dietary fiber is also recognized by some as a source of dietary fiber, see B. Lewis, "Dietary Fiber", *Encyclopedia of Chemical Technology*, Vol. 7, pp. 628-638 (Kirk-Othmer eds., John Wiley & Sons, Inc. 3d ed., 1979), which may have effects that are different from insoluble dietary fiber.

It would be desirable to produce a dietary fiber supplement from only corn hulls, yet having a ratio of insoluble to soluble fibers that can be varied as desired. However, it is impractical to chemically treat (e.g. degrade) corn hulls to increase the solubility of constituents thereof without significantly changing the functionality of the corn bran.

U.S. Pat. No. 4,565,702 (Morley et al.) discloses a dietary fiber composition prepared by coating an insoluble fiber (e.g. purified corn or wheat bran) with a soluble fiber selected from the group consisting of alginates, gums (e.g. arabic, tragacanth, karaya, ghatti, and seaweed extracts including agar, carrageenan and furcellan), pectin, mucillages (such as psyllium) and similar plant exudates, and mixtures thereof.

European Patent Publication No. 190826, published Aug. 13, 1986 on E.P.O. Application No. 86300236.6, filed Jan. 15, 1986, discloses an ingestible aggregate comprising a pre-swelled substantially anhydrous hydrocolloid and a substrate. Hemicellulose is listed only as an example of a substrate. The aggregates are prepared by contacting the substrate with an aqueous solution of the hydrocolloid to form aggregates and then drying and collecting the aggregates.

SUMMARY OF THE INVENTION

In one aspect, this invention relates to a composition of matter useful as a dietary fiber supplement comprising:
(a) an insoluble dietary fiber material, and
(b) a coating on said insoluble dietary fiber material comprised of hemicellulose.

In another aspect, this invention relates to a method of coating an insoluble dietary fiber with hemicellulose comprising:
(a) coating insoluble dietary fiber with a solution of hemicellulose in an aqueous solvent, and
(b) removing said aqueous solvent from said coating to deposit said hemicellulose upon said insoluble dietary fiber.

The composition of this invention is comprised of both soluble (hemicellulose) and insoluble (e.g. grain hulls) fiber, preferably derived from a single ultimate source (e.g. corn grain hulls), in a ratio that can be varied as desired in accordance with the method of this invention.

In a particular aspect, the invention relates to a method of preparing a soluble/insoluble dietary fiber supplement from corn grain hulls comprising:
(a) removing from a first portion of corn grain hulls at least a portion of a digestible component thereof to concentrate the dietary fiber content thereof and yield an insoluble fiber;
(b) extracting hemicellulose from a second portion of corn grain hulls,
(c) coating the insoluble fiber with the hemicellulose using an aqueous medium, and
(d) drying the coated insoluble fiber to yield a coated fiber composition.

DETAILED DESCRIPTION OF THE INVENTION

The composition of the invention is comprised of a water-soluble component and a water-insoluble component, preferably both derived from corn grain hulls (hereinafter referred to generally as corn bran). The water-insoluble fiber can generally be derived from any conventional plant sources. Examples of fiber sources are cellulose from wood pulp and preferred fiber sources are the fiber material produced by the milling of cereals or legumes, e.g. cereal brans such as corn, wheat and rice, and oilseeds such as soybean, sunflower, and cottonseeds. Typically, the insoluble fiber is pasteurized prior to use, for example, as in U.S. Pat. No. 4,181,747 (Kickle et al.). The water-insoluble fiber can be comprised of a substantial amount of normally water-soluble components (e.g. starch, protein, etc.) that are held in a matrix of water-insoluble matrix, thus inhibiting the leaching of these components from the fiber.

The preferred water-insoluble fiber is corn bran. Corn bran is obtained from the grain by conventional milling techniques. In wet corn milling, which is the most common source of corn bran, corn kernels (*Zea mays*) are steeped in dilute sulfurous acid to soften the outer layers of the grain. The moist corn kernels are then lightly ground in a mill to separate the intact germ from the remainder of the cracked kernel. The germ is separated from the resulting cracked kernels by flotation of the germ. The resulting cracked kernels are powdered in a burr mill and the hulls (i.e. bran) are removed by screening the bran from the remaining starch and protein. The bran, which contains protein bound in a matrix comprised of hemicelluloses, cellulose and other constituents, are commonly used as, or to produce, a corn gluten feed.

As indicated above, the corn bran starting material of this invention is typically obtained by powdering shelled and degermed corn and screening the crude bran from the powdered starch and protein. Accordingly, the crude bran particles initially have a mean particle diameter in at least one dimension greater than the powdered starch and protein from which it is screened. A major portion of the weight of the bran will typically have a mean particle diameter in at least one dimension greater than about 1 mm. The physical and chemical characteristics of the crude bran as produced by milling can be further modified prior to coating, e.g. particle size reduction, moisture content reduction, component extraction, etc. In particular, the crude corn bran is generally mechanically refined, i.e. reduced in particle size, by conventional techniques, examples of which include milling dried, crude bran in a classifying pin mill. The crude bran is generally mechanically refined sufficient to allow at least 80 percent to pass a No. 20 mesh screen (850 micrometer openings). Preferred refined bran will pass at least 80% through a No. 60 mesh screen (250 micrometer openings), and most preferred will pass at least 95% through a No. 100 mesh screen (150 micrometer openings) and 90% through a No. 200 mesh screen (75 micrometer openings).

The isolated bran will contain small, but potentially significant, amounts of fat, protein, and starch that can be removed. An example of the steps that can be used to remove these digestible materials from the isolated bran is disclosed in the Association of Analytical Chemists publication "Total Dietary Fiber: AOAC Collaborative Study," Jan. 25, 1982, incorporated herein by reference. This technique utilizes enzymatic and chemical procedures to isolate the dietary fiber. When corn bran is treated according to this AOAC method, the recoverable dietary fiber is a non-digestible insoluble fiber. The bran is first treated with a solvent, e.g., petroleum ether or hexane, to remove the fat. The defatted bran is then digested enzymatically with protease. (However, one can usually dispense with the protease treatment when working with corn bran and still obtain an excellent dietary fiber.) Finally, the bran is treated with $\alpha$ or $\beta$-amylase and amyloglucosidase. The recoverable material is protein-free, fat-free and carbohydrate-free insoluble dietary fiber. Thus the recovered material is essentially non-digestible fiber, free of any association or residue of digestibles.

A more practical method of isolating the insoluble fiber is accomplished by aqueous leaching of the corn hulls, typically after heat pasteurization as disclosed in U.S. Pat. No. 4,181,747, the pertinent disclosure of which is incorporated by reference. (Such heat pasteurization generally includes slurrying vegetable hulls in water, adjusting the pH of the slurry to avoid color development, and heating the slurry to pasteurize the same.) The aqueous leaching is generally accomplished by slurrying the vegetable hulls and then dewatering the slurry. Agitation of the slurry will facilitate physical separation of digestible residues (e.g. starch and protein) from the fiber, as well as efficient solvation of soluble residues. The sequence of slurrying and dewatering can be repeated as desired, however, a point of diminishing returns will generally occur. In general, variations on these methods can also be employed, e.g. solvent removal of fat and enzyme digestion of only starch followed by aqueous leaching.

The soluble component of the composition of this invention is hemicellulose, preferably derived from corn grain hulls. Examples of other sources of hemicellulose are vegetable hemicelluloses, particularly other cereal grains, such as wheat, oats, and rice, and legumes. The hemicellulose derived from corn grain hulls is characterized as a highly branched arabinoxylan that is also comprised of minor amounts of galactose and uronic acid units. The hemicellulose can be extracted from corn bran with aqueous alkali. Solutions of sodium hydroxide or carbonate at pH 10.5–11.5 have conventionally been heated to boiling for one hour in contact with corn hulls to extract hemicellulose therefrom as disclosed in U.S. Pat. No. 2,709,699 (Wolf et al.). Filtration or centrifugation separates the soluble hemicellulose gum from the remaining solid material. Acidification of the filtrate or centrifugate to pH 4.0 and addition of ethanol or isopropanol will precipitate the hemicellulose gum. A more practical extraction uses lime water (a solution of calcium hydroxide) to extract the hemicellulose as disclosed in U.S. Pat. No. 2,801,955 (Rutenberg et al.) and U.S. Pat. No. 2,868,778 (Watson et al.). Isolation of the hemicellulose can also be accomplished by ultrafiltration and spray drying of the filtrate.

The composition of this invention is prepared by coating the insoluble fiber component with the soluble fiber component. Because the soluble fiber is readily soluble in water, the most convenient means employ an aqueous solution of the soluble fiber to coat the insoluble fiber and then removal of the water from the coating. The coating procedure can be a simple mixing process whereby the insoluble and soluble fibers are mixed in a pot using water as a carrier and mixing aid. The mixture would then be spread out to dry and subsequently used in a food product. Additionally, other known coating procedures are useful, such as fluidized bed granulation coating whereby coating and drying takes place in one process.

The isolated hemicellulose gum dissolves in hot or cold water at acid, neutral, or alkaline pH. Aqueous solutions of up to 30–40% solids can be readily prepared. Viscosity of solutions at below about 6% solids are much like those of gum arabic (i.e. low viscosity) and above about 10% solids are much like those of gum Karaya (i.e. high viscosity).

In preferred embodiments, the insoluble fiber is suspended in a fluid bed of air and an aqueous solution of hemicellulose (e.g. at 5% solids) is sprayed into the bed, thus coating the insoluble fiber. The product is then dried in the air bed until the desired moisture level is obtained.

In alternative embodiments, the insoluble fiber and hemicellulose can be dry mixed and then wetted to cause the hemicellulose to dissolve and coat the insoluble fibers. This approach avoids the energy expenditure in dissolving large amounts of dilute solutions and/or the difficulties associated with spraying viscous high solids solutions of hemicellulose.

Another embodiment entails slurrying insoluble fiber in an aqueous solution of hemicellulose and then adding a miscible organic solvent (e.g. ethanol or isopropanol) to precipitate the hemicellulose and thus coat the insoluble fiber. The product can then be filtered or centrifuged to obtain a wet coated product that can be dried.

The coating process requires the use of water as the carrier and mixing aid. While moisture is necessary during the coating process, it should be substantially removed from the coated fibers once the coating process is complete. This can be accomplished by common drying techniques such as air drying, oven drying, vacuum drying, and the like.

The ratio of insoluble fiber to hemicellulose can vary broadly, but will generally be greater than 1, e.g. from about 1:1 to about 50:1, preferably from about 10:1 to about 30:1.

The dietary fiber compositions of this invention can be incorporated into a variety of foods intended to provide high dietary fiber content with low caloric value. For example, breakfast cereals, snack foods such as candy bars, fiber tablets and fruit rolls and the like are among the food products which can be prepared using the dietary fiber composition. Food products should contain the dietary fiber of this invention in amounts of about 10% to about 40%, preferably about 10% to about 30% by weight and most preferably in amounts of about 15% to about 25% of the total food product.

EXAMPLES

The following process can be used to prepare a composition of this invention. Dewatered corn grain hulls are obtained from the wet milling process to be used as insoluble fiber. The fat portions of the insoluble fiber are removed by extraction with a solvent such as petroleum ether or hexane. The resultant defatted insoluble fiber is then treated enzymatically with protease to remove protein and then with termamyl (heat stable $\alpha$- or $\beta$-amylase) and amyloglucosidase to remove carbohydrates.

The insoluble fiber is defatted by placing the fiber sample in a beaker with the solvent and stirring for about 15 minutes. The mixture is then allowed to stand at room temperature for about one minute and the solvent decanted off. These steps are repeated at least twice. Approximately 25 ml of solvent is used for every 10 grams of fiber sample. After the solvent is decanted, the fiber is then oven or air dried.

The dried defatted fiber is then mixed in a container with a buffer solution, e.g., a phosphate buffer solution with pH about 6.0, and termamyl solution and the container is placed in boiling water both for about 15 minutes, with light agitation at 5 minute intervals. The mixture is then cooled and its pH is adjusted to about 7.5±0.1 through the addition of 0.285N NaOH solution. Protease is then added and the mixture is incubated at 60° C. for 30 minutes with continuous agitation. The mixture is then cooled and the pH is adjusted with acid (e.g., phosphoric and solution) to about 4.5–0.2. Amyloglucosidase is then added and the solution mixture is incubated at 60° C. for 30 minutes with continuous agitation. Next, 95% ethyl alcohol is added. The enzyme digest is then filtered off and the residue is washed first with ethyl alcohol and then with acetone and subsequently dried, preferably in a vacuum oven or an air oven.

Alternatively, an insoluble-fiber can be prepared from corn hulls as follows. Crude corn bran is obtained from that portion of wet milled corn which does not pass through a screen (Roball). The crude corn bran is then separated into a light and a heavy fraction by means of an air classifier (Carter Duo-Aspirator). The light fraction comprises about 85% by weight of the crude corn bran. The light fraction corn bran is then slurried to about 2.5–7.0% solids. The slurry pH is then adjusted to 4.0–4.5, if necessary, with $H_2SO_4$ or NaOH. The corn bran slurry is then heated to 160° F. and held at this temperature for about 45 minutes. The slurry is then dewatered, washed, dewatered again, and then dried to about 8–12% moisture. No heat is used in the first zone of the belt dryer, and a temperature of about 230° F. is used in the second and third zones, and in the preheater. The amount of moisture remaining in the dried corn bran is determined by controlling the belt speed.

Hemicellulose extracted from wet milled corn grain hulls with aqueous alkali is dissolved in water at 5% solids. Insoluble fiber to be coated is suspended in a fluidized bed dryer in air at 70°–90° C. The hemicellulose solution is sprayed evenly into the bed until a ratio of insoluble fiber to hemicellulose of between about 10:1 and 30:1 is obtained. The product is then dried in the fluidized bed until the product temperature is about 70°–80° C.

What is claimed is:

1. A method of preparing a soluble/insoluble dietary fiber supplement from corn bran comprising:
   (a) removing from a first portion of corn bran at least a portion of a digestible component thereof to concentrate the dietary fiber content thereof and yield an insoluble fiber;
   (b) extracting hemicellulose from a second portion of corn bran,
   (c) coating the insoluble fiber with the hemicellulose using an aqueous medium, and
   (d) removing said aqueous medium from said coating to deposit said hemicellulose upon said insoluble fiber.

2. A method of claim 1 wherein said insoluble fiber is suspended in a fluidized bed during said coating and said removing.

3. A method of claim 1 wherein said insoluble fiber is sprayed with a solution of hemicellulose in said aqueous medium.

4. A method of claim 1 further comprising dry mixing said insoluble fiber and hemicellulose and then mixing water as the aqueous medium with the resulting dry mixture.

5. A method of claim 4 wherein said dry mixing is accomplished in a fluidized bed into which water is introduced.

6. A method of claim 1 wherein said coating is accomplished by precipitating said hemicellulose from said aqueous medium onto said insoluble fiber and said removing is accomplished by physically isolating the resulting coated insoluble fiber from the resulting aqueous phase and then drying the resulting isolated and coated insoluble fiber.

7. A method of claim 1 wherein the weight ratio of insoluble fiber to hemicellulose deposited on said insoluble fiber ranges from about 1:1 to about 50:1.

8. A method of coating an insoluble dietary fiber with hemicellulose comprising;
   (a) dry mixing said insoluble dietary fiber and hemicellulose and then mixing water as an aqueous solvent with the resulting dry mixture to coat said insoluble dietary fiber with a solution of hemicellulose in aqueous solvent, and
   (b) removing said aqueous solvent from said mixture to deposit said hemicellulose upon said insoluble dietary fiber.

9. A method of claim 8 wherein said dry mixing is accomplished in a fluidized bed into which water is introduced.

10. A method of claim 8 wherein said insoluble dietary fiber and said hemicellulose are derived from corn grain hulls and the weight ratio of said insoluble dietary fiber to said hemicellulose ranges from about 1:1 to about 50:1.

11. A method of coating an insoluble dietary fiber with hemicellulose comprising:
    (a) coating insoluble dietary fiber with a solution of hemicellulose in an aqueous solvent, and
    (b) removing said aqueous solvent from said coating to deposit said hemicellulose upon said insoluble dietary fiber, wherein said coating is accomplished by precipitating said hemicellulose from said aqueous solution onto said insoluble dietary fiber and said removing is accomplished by physically isolating the resulting coated insoluble dietary fiber from the resulting aqueous phase and then drying the resulting isolated and coated insoluble dietary fiber.

12. A method of claim 11 wherein said insoluble dietary fiber and said hemicellulose are derived from corn grain hulls and the weight ratio of said insoluble dietary fiber to said hemicellulose ranges from about 1:1 to about 50:1.

* * * * *